May 26, 1925. 1,539,650
K. DOMBECK
BUSH TRIMMER
Filed Dec. 20, 1923 2 Sheets-Sheet 2
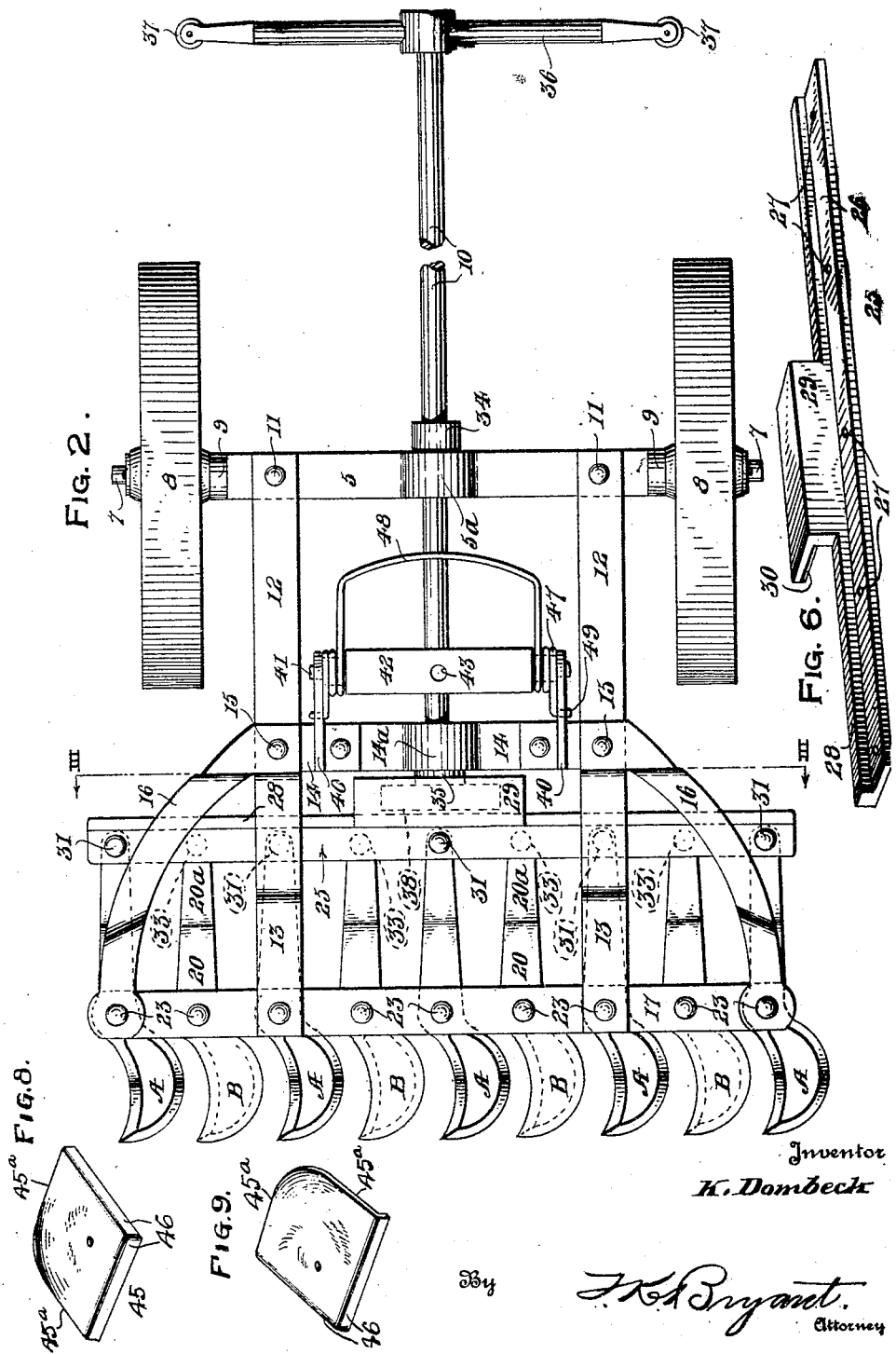
Inventor
K. Dombeck
By F. K. Bryant
Attorney Patented May 26, 1925.

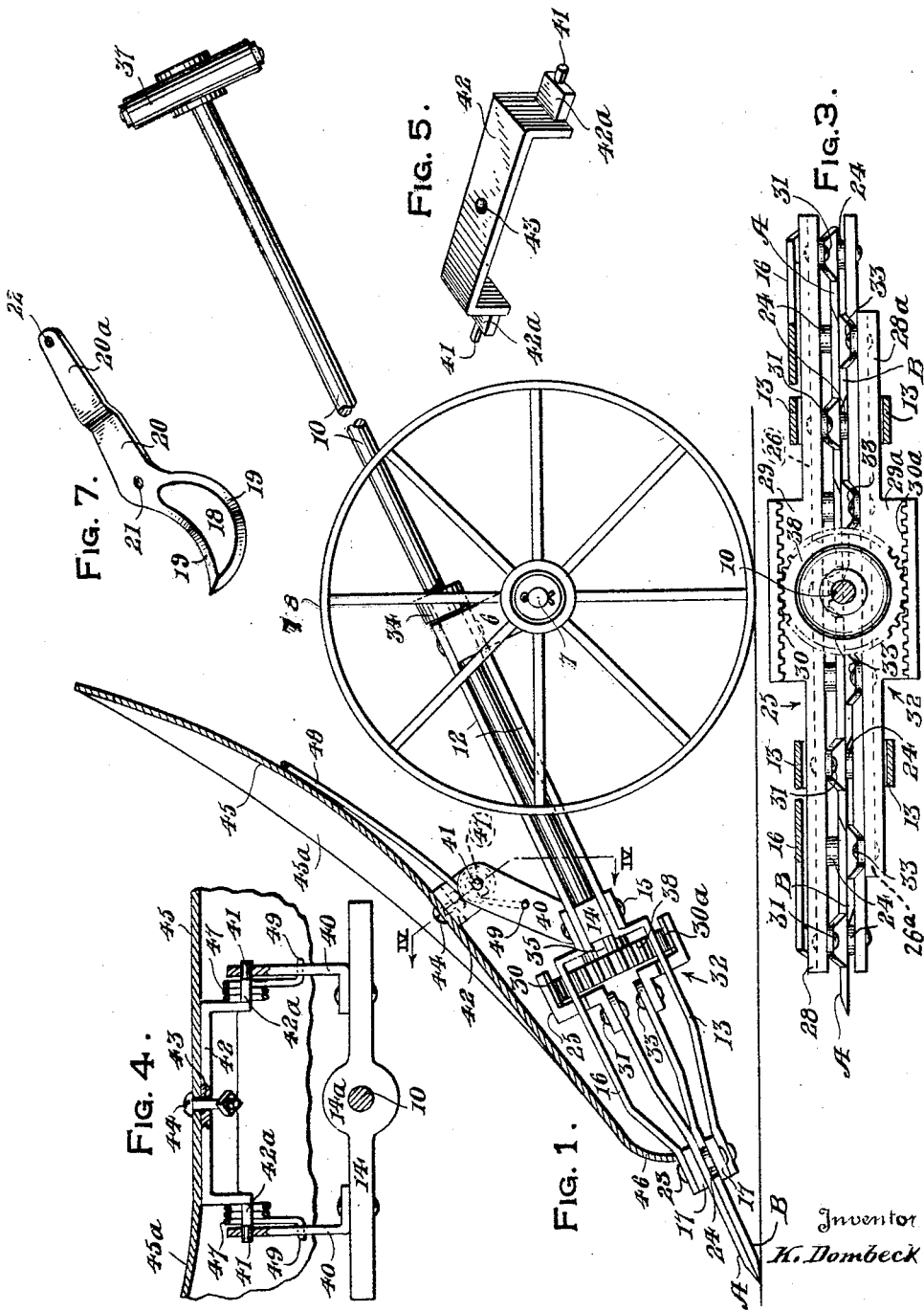

1,539,650

UNITED STATES PATENT OFFICE.

KAZIMER DOMBECK, OF AMSTERDAM, NEW YORK.

BUSH TRIMMER.

Application filed December 20, 1923. Serial No. 681,768.

*To all whom it may concern:*

Be it known that I, KAZIMER DOMBECK, a citizen of the United States of America, residing at Amsterdam, in the county of Montgomery and State of New York, have invented certain new and useful Improvements in Bush Trimmers, of which the following is a specification.

This invention relates to new and useful improvements in bush trimmers of the wheeled type.

An important object of the invention is to provide a trimmer that is especially adapted for heavy work, such as cutting bushes having relatively stout or thick branches, corn stalks, etc.

A further object of the invention is to provide an implement of the above mentioned type which may be readily manipulated by hand and comprises certain features of construction and combinations of parts which produce a very efficient device and one that may be manufactured at a very nominal cost.

Other objects and advantages of the invention will be apparent during the course of the following description.

In the accompanying drawings forming a part of this specification and in which like numerals are employed to designate like parts throughout the same, Figure 1 is a side elevational view of the implement embodying this invention with the mold board, associated therewith, shown in longitudinal section, Figure 2 is a top plan view of the implement shown in Fig. 1 with the mold board removed, Figure 3 is a transverse sectional view taken upon line III—III of Fig. 2, Figure 4 is a transverse sectional view taken upon line IV—IV of Fig. 1, Figure 5 is a detail perspective view of the bridge piece which is employed for supporting the mold board, Figure 6 is a detail perspective view of one of the blade operating bars embodied in this invention, and Figure 7 is a detail perspective view of one of the blades.

Figures 8 and 9 show the construction of the mold board removed from the implement.

In the drawings, wherein for the purpose of illustration is shown a preferred embodiment of this invention, the numeral 5 designates the transversely extending rear frame bar having the depending end portions 6 which are provided with the stub axles 7 at their lower ends which extend laterally outwardly and are in axial alinement. These stub axles 7 are adapted for rotatably supporting the ground engaging wheels 8 which are retained in spaced relation to the depending end portions 6 of the rear frame bar 5 by means of the spacer rings 9. This transversely extending rear frame bar 5 is further provided with a bearing portion $5^a$ which is adapted for rotatably supporting an operating shaft 10 which will be described in detail at a later point. Properly secured to the transversely extending rear frame bar 5, as at 11, are the forwardly extending frame bars 12 which are arranged in pairs and positioned adjacent each end of the said bar 5 and are connected thereto at opposite side faces thereof. These forwardly extending frame bars 12 are provided for substantially the forward half of their lengths with oppositely offset end portions 13, as best illustrated in Fig. 1. The forwardly extending frame bars 12, in juxtaposition to the starting points of the oppositely offset end portions 13, are provided with a front transversely extending frame bar 14 which is interposed between the opposite pairs of bars 12 and secured thereto, as at 15. This front transversely extending frame bar 14 is provided with a bearing portion $14^a$ which is in axial alinement with the bearing portion $5^a$ of the rear transversely extending frame bar 5 and is provided for further supporting the operating shaft 10. Connected to the forwardly extending frame bars 12, as at 15, are the auxiliary forwardly extending frame arms 16 which are of arcuate formation in plan view and terminate at their outer ends in transverse alinement with the outer ends of the oppositely offset end portions 13. These oppositely offset end portions 13 and auxiliary frame arms 16 are adapted for supporting the parallel rigid blade supporting bars 17, as best illustrated in Figs. 1 and 2.

In Fig. 7, there is shown in detail one of the cutting blades which consists of a blade portion 18 having the opposite arcuate cutting edges 19 and the shank portion 20 having the offset end portion $20^a$. The shank portion 20 is provided with an aperture 21 while the extreme outer end of the offset shank portion $20^a$ is provided with an aperture 22. In Figs. 1 and 2, the parallel rigid blade supporting arms 17 are illustrated as being provided with equi-spaced bolts or rivets 23 which are employed for connecting the cutting blades, by means of the apertures 21 formed in the shank portions 20, to the said rigid bars 17. It will be seen by inspecting Fig. 2 that these cutting blades are arranged in two sets, which I will describe as sets A and B, the set A being positioned with their beveled surfaces, which form the cutting edges 19, extending downwardly and the said bevel surfaces of the set B extending upwardly. The set of cutting blades A are connected to the parallel rigid blade supporting bars 17 by means of every alternate bolt or rivet 23 and are provided with a spacer washer 24 between their lower faces and the lower blade supporting bar 17 while the set of cutting blades B are provided with similar spacer washers 24 which are positioned between their upper faces and the upper rigid blade supporting bar 17. It will be seen by this arrangement, that the opposite cutting edges of the respective sets A and B will be arranged in operative relation to each other.

In Fig. 6, there is shown in detail the upper blade operating bar 25 which consists of a horizontally extending section 26 having five equi-spaced apertures 27 formed therein and being provided with a vertically extending flange portion 28 and an offset rack bar section 29 centrally associated therewith. This offset rack bar section is provided with the rack teeth 30 which are exposed from the under side thereof. The five equi-spaced apertures 27 are intended for pivotally connecting the rear ends of the offset shank portions 20ª of the cutting blades in the set A by means of the rivets 31 which extend through these apertures 27 and through the apertures 22 formed in the said shank portion of the cutting blades. The four cutting blades in the set B are provided with a blade operating bar 32 which will be termed the lower bar, for the purpose of distinguishing the same from the upper bar 25, and differs from this upper bar 25 in that it does not possess as great a length and is provided with four apertures only for receiving the rivets 33 which, by means of the apertures 22 formed in the offset shank portions 20ª of the set of cutter blades B, connect the said inner ends of this set of blades to the lower blade operating bar 32. It will be seen, by inspecting Figs. 1 and 3, that this lower blade operating bar 32 is provided with a horizontally extending portion 26ª having a downwardly extending flange 28ª that is formed, at its central portion, with the depending angular rack bar section 29ª which is provided with the rack teeth 30ª.

The operating shaft 10, which extends through the axially alined bearing portions 5ª and 14ª, is provided with collars 34 and 35 which prevent longitudinal movement of the said shaft in respect to the transversely extending rear and front frame bars 5 and 14. The extreme outer end of this operating shaft 10 is provided with a cross bar 36 having handle grips 37 at the opposite ends thereof for permitting the said implement to be moved over the surface of the ground and for permitting the said operating shaft 10 to be oscillated within the supporting bearings formed in the bars 5 and 14. The extreme inner end of this operating shaft 10 is provided with a gear 38 which is suitably keyed to the said shaft and engages the opposed rack teeth 30 and 30ª carried by the upper and lower blade operating bars 26 and 26ª respectively. It will be seen by this connection, that when the operating shaft 10 and its gear 38 are rotated first in one direction, then in the opposite direction, the blade operating bars 25 and 32 will be caused to reciprocate in opposite directions in respect to each other. It further will be seen that this reciprocating movement of the upper and lower blade operating bars in opposite directions in respect to each other will cause the cutting blades to oscillate upon the bolts or rivets 23 and thereby bring each blade of one set into cutting cooperation with the two adjacent blades of the other set alternately.

The transversely extending front frame bar 14 is provided, on opposite sides of the bearing portion 14ª, with uprights 40 that are rigidly secured to the said bar 14 and extend rearwardly at an angle therefrom. The upper free ends of these uprights 40 are provided with apertures for receiving the reduced transversely extending ends 41 of the bridge piece 42. This bridge piece 42 is provided with a centrally positioned aperture 43 for the purpose of receiving the clamping bolt 44 which connects the mold board 45 thereto. In Fig. 1, the mold board 45 is shown as being provided with an arcuate edge 46 which is intended to be positioned in transverse relation to the various cutting blades and terminates in parallelism with the rivets 23 and slightly to the rear thereof. This mold board is further provided with an upwardly extending portion 45ª which is adapted for directing the branches or the like cut from bushes laterally to one side of the implement. It is to be understood that the edge of the mold board 45 extending in parallelism with the upwardly directed portion 45ª and at right angles to the edge 46 is bent downwardly in the same manner as the said edge 46 for the purpose of permitting the mold board to be pivoted on the bolt 44 for placing the upwardly directed portion 45ª on the left hand side of the implement so that the severed portions of bushes, or the like will be discharged laterally to the right of the implement instead of to the left of the implement, this being, of course, to the right of the operator as he stands at the rear facing forwardly, as will result with the mold board in the position as illustrated in Fig. 1. For the purpose of retaining the downwardly curved arcuate edge 46 in engagement with the offset forwardly extending frame bar portions 13 and the auxiliary frame arm 16, the lateral projections 42ᵃ, of the bridge piece 42 carry the coiled end portions 47 of the substantially U-shaped wire spring 48 which has its extreme ends 49 extended through suitable apertures formed in the uprights 40. By inspecting Fig. 1, it will be seen that the central portion of this substantially U-shaped wire spring 48 will bear against the under surface of the mold board 45 for forcing upwardly upon the portion of the same positioned above the pivot bolt 44.

It is believed that the manner of construction and operation of this implement will be thoroughly understood from the above detail description. It might be well to note, however, that the implement may be moved over the ground by the operator until the cutting blades are positioned in cutting relation to the bush or object to be trimmed. The operating shaft 10, by means of the cross bar 36, may be rotated in opposite directions for causing the gear 38 to rotate in a similar manner. The rotation of this gear 38, due to its connection with the teeth of the rack bar sections 29 and 29ᵃ, will cause the upper and lower blade operating bars 25 and 32 to reciprocate for causing the different sets of blades A and B to be moved towards each other for severing the same branches of the bushes.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, I claim:—

1. In a bush trimmer, a wheel supported frame having a pair of transversely disposed vertically spaced bars at its forward end, shear blades arranged in sets with the blades of one set alternating with the blades of the other, said blades being pivoted between said bars and having offset shanks extending rearwardly from the bars, a pair of bars each having the shanks of a respective set of blades pivoted thereto, racks on the confronting faces of said bars, a pinion between and meshing with the racks, a shaft journalled in said frame and carrying said pinion, and a handle on the rear end of said shaft.

2. In a bush trimmer, a wheel supported frame having cutters at its forward end and including a transverse member beneath which said cutters are pivoted, a pair of spaced standards on said frame, a bridge piece journalled in said standards, a mold board carried by said bridge piece and having one edge resting on the transverse member, spring means urging said edge against said member, and means to operate the cutters.

In testimony whereof I affix my signature.

KAZIMER DOMBECK.